(12) United States Patent
Okada et al.

(10) Patent No.: US 7,839,574 B2
(45) Date of Patent: Nov. 23, 2010

(54) HEAD-UP DISPLAY OPTICAL FILM, HEAD-UP DISPLAY, AND VEHICLE

(75) Inventors: Naotada Okada, Kanagawa-ken (JP); Kazuo Horiuchi, Kanagawa-ken (JP); Haruhiko Okumura, Kanagawa-ken (JP); Takashi Sasaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/323,627

(22) Filed: Nov. 26, 2008

(65) Prior Publication Data
US 2009/0153962 A1 Jun. 18, 2009

(30) Foreign Application Priority Data
Nov. 26, 2007 (JP) ............... 2007-304029

(51) Int. Cl.
*G02B 27/14* (2006.01)
*G03H 1/00* (2006.01)

(52) U.S. Cl. ....................... 359/630; 359/13

(58) Field of Classification Search .................. 359/13, 359/629, 630
See application file for complete search history.

(56) References Cited

U.S. PATENT DOCUMENTS

| 7,158,059 B2 | 1/2007 | Noda et al. |
| 2006/0023315 A1 | 2/2006 | Robinson |
| 2009/0128751 A1* | 5/2009 | Wu et al. ............ 349/103 |

\* cited by examiner

*Primary Examiner*—William C Choi
(74) *Attorney, Agent, or Firm*—Oblon, Spivak, McClelland, Maier & Neustadt, L.L.P.

(57) ABSTRACT

A head-up display optical film includes: a first optical layer configured to convert the polarization plane of incident light by 90 degrees; a second optical layer configured to convert the polarization plane of incident light by 90 degrees; and an intermediate optical layer sandwiched between the first optical layer and the second optical layer and having a refractive index that is different from the refractive index of the first optical layer and from the refractive index of the second optical layer.

18 Claims, 8 Drawing Sheets

HEAD-UP DISPLAY OPTICAL FILM, HEAD-UP DISPLAY, AND VEHICLE

CROSS-REFERENCE TO RELATED APPLICATIONS

This application is based upon and claims the benefit of priority from the prior Japanese Patent Application No. 2007-304029, filed on Nov. 26, 2007; the entire contents of which are incorporated herein by reference.

BACKGROUND OF THE INVENTION

1. Field of the Invention

This invention relates to a head-up display optical film, a head-up display, and a vehicle.

2. Background Art

Head-up display (HUD) displays various traffic information through the windshield of a vehicle such as a car and an aircraft on the external background field. In such a head-up display, 3-4% reflection at each air-windshield interface on the inside and outside of the windshield doubles the projected image and deteriorates visibility.

There is a solution of providing a anti-reflection layer on the outside interface of the windshield to decrease the outside reflectance resulting in the suppression of double image. However, it is ineffective when a water layer is formed on the low-reflection layer, for example, in rainy weather.

On the other hand, U.S. Pat. No. 7,158,059B2 proposes a method of using a half-wave plate to cause S-polarized light to be incident on the windshield at Brewster's angle. However, it has a problem in that the image is invisible to a user wearing a polarized sunglass that does not transmit S-polarized light.

SUMMARY OF THE INVENTION

According to an aspect of the invention, there is provided a head-up display optical film including: a first optical layer configured to convert the polarization plane of incident light by 90 degrees; a second optical layer configured to convert the polarization plane of incident light by 90 degrees; and an intermediate optical layer sandwiched between the first optical layer and the second optical layer and having a refractive index that is different from the refractive index of the first optical layer and from the refractive index of the second optical layer.

According to another aspect of the invention, there is provided a head-up display including: a head-up display optical film including: a first optical layer configured to convert the polarization plane of incident light by 90 degrees; a second optical layer configured to convert the polarization plane of incident light by 90 degrees; and an intermediate optical layer sandwiched between the first optical layer and the second optical layer and having a refractive index that is different from the refractive index of the first optical layer and from the refractive index of the second optical layer; and a projector configured to cause a P-polarized light beam to be incident on the optical film at Brewster's angle.

According to another aspect of the invention, there is provided a vehicle including: a generally plate-like transparent plate; and a head-up display including: a head-up display optical film including: a first optical layer configured to convert the polarization plane of incident light by 90 degrees; a second optical layer configured to convert the polarization plane of incident light by 90 degrees; and an intermediate optical layer sandwiched between the first optical layer and the second optical layer and having a refractive index different from the refractive index of the first optical layer and from the refractive index of the second optical layer; and a projector configured to cause a P-polarized light beam to be incident on the optical film at Brewster's angle; the head-up display optical film being provided on a major surface of the transparent plate.

DETAILED DESCRIPTION OF THE INVENTION

Embodiments of the invention will now be described in detail with reference to the drawings.

First Embodiment

Figure 1:
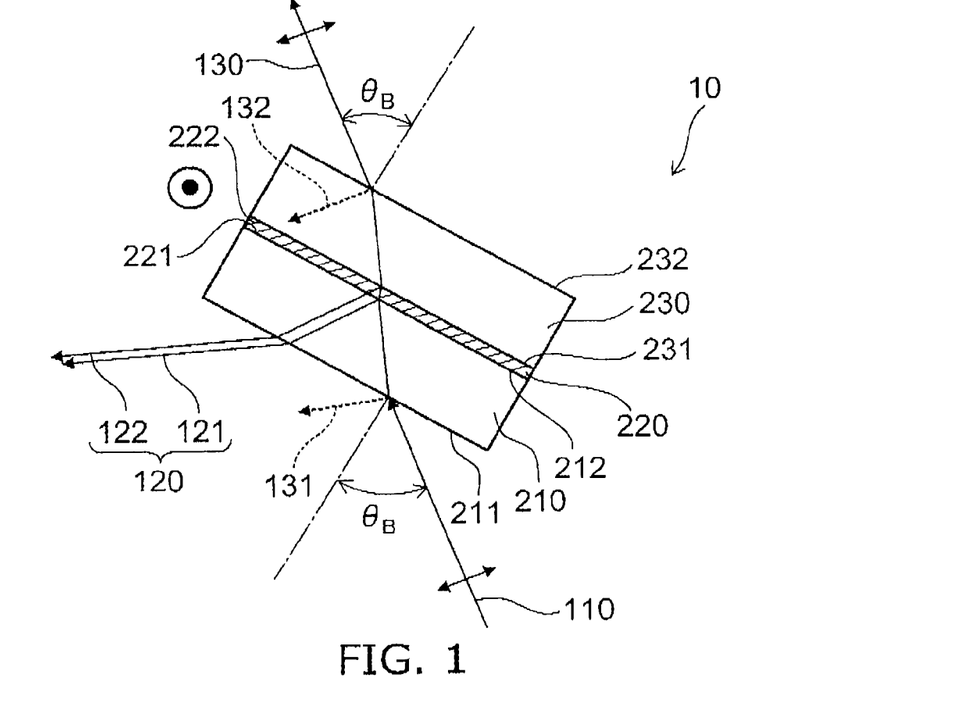
FIG. 1 is a schematic view illustrating the configuration of a head-up display optical film according to a first embodiment of the invention.

FIG. 1 is a schematic view illustrating the configuration of a head-up display optical film according to a first embodiment of the invention.

As shown in FIG. 1, the head-up display optical film 10 of the first embodiment includes a first optical layer 210 for converting the polarization plane of incident light by 90 degrees, a second optical layer 230 for converting the polarization plane of incident light by 90 degrees, and an intermediate optical layer 220 sandwiched between the first optical layer 210 and the second optical layer 230. The refractive index $n_2$ of the intermediate optical layer 220 is designed to be different from both the refractive index $n_1$ of the first optical layer 210 and the refractive index $n_3$ of the second optical layer 230.

The first optical layer 210 and the second optical layer 230 can be a half-wave plate illustratively made of a stretched film of an organic resin, and accordingly serve to convert the incident light from P-polarization to S-polarization, or from S-polarization to P-polarization.

P-polarized incident light 110 is caused to be incident on the head-up display optical film 10 configured as above at an incident angle of Brewster's angle $\theta_B$. That is, P-polarized incident light 110 is incident on the first major surface 211 of the first optical layer 210 at Brewster's angle $\theta_B$. The incident light 110 propagates in the first optical layer 210 and reaches the second major surface 212 of the first optical layer 210. Here, because the refractive index $n_1$ of the first optical layer 210 is different from the refractive index $n_2$ of the intermediate optical layer 220, the incident light is reflected at the interface between the first optical layer 210 and the intermediate optical layer 220 to produce first reflected light 121. At this time, at the second major surface 212 of the first optical layer 210, the incident light has been converted to S-polarized light, and hence the reflectance of S-polarized light is obtained. For example, assuming that the refractive index $n_1$ of the first optical layer 210 is 1.5 and that the refractive index $n_2$ of the intermediate optical layer 220 is 2.0, the reflectance of the first reflected light 121 at the interface between the first optical layer 210 and the intermediate optical layer 220 is approximately 3.5%. After the first reflected light 121 is reflected with S-polarization at the interface between the first optical layer 210 and the intermediate optical layer 220, the first reflected light 121 propagates in the first optical layer 210 and reaches the first major surface 211 of the first optical layer 210. At this time, the first reflected light 121 has been P-polarized. Hence, the first reflected light 121 is emitted from the head-up display optical film 10 in the P-polarized state.

On the other hand, the incident light 110 propagates in the intermediate optical layer 220 and reaches the interface between the intermediate optical layer 220 and the second optical layer 230 (the first major surface 231 of the second optical layer 230). Here, because the refractive index $n_2$ of the intermediate optical layer 220 is different from the refractive index $n_3$ of the second optical layer 230, the incident light is reflected at the interface between the intermediate optical layer 220 and the second optical layer 230 to produce second reflected light 122. At this time, in the intermediate optical layer 220, the light propagates with S-polarization, and hence the reflectance of S-polarized light is obtained. For example, assuming that the refractive index $n_3$ of the second optical layer 230 is 1.5 and that the refractive index $n_2$ of the intermediate optical layer 220 is 2.0, the reflectance of the second reflected light 122 at the interface between the intermediate optical layer 220 and the second optical layer 230 is approximately 3.5%. After the second reflected light 122 is reflected with S-polarization at the interface between the intermediate optical layer 220 and the second optical layer 230, the second reflected light 122 propagates in the intermediate optical layer 220 and reaches the first optical layer 210 and the first major surface 211 of the first optical layer 210. At this time, the second reflected light 122 has been P-polarized. Hence, the second reflected light 122 is emitted from the head-up display optical film 10 in the P-polarized state.

The first reflected light 121 and the second reflected light 122 are visible as a view of the head-up display. That is, the sum of the first reflected light 121 and the second reflected light 122 is visible as total reflected light 120. The reflectance of the total reflected light 120 is the sum of the reflectances of the first reflected light 121 and the second reflected light 122. In the above example, one can see the bright image with a reflectance of approximately 7%. Furthermore, because the first reflected light 121 and the second reflected light 122 are both P-polarized, one can see the image even using a polarized sunglass that blocks S-polarized light.

Thus, the head-up display optical film 10 illustrated in FIG. 1 can efficiently reflect P-polarized incident light and produce P-polarized reflected light.

In the foregoing, at the interface between the first optical layer 210 and the intermediate optical layer 220 and the interface between the intermediate optical layer 220 and the second optical layer 230, the reflectance of S-polarized light is obtained. However, if P-polarized light is incident on these interfaces, the reflectance of P-polarized light is approximately 1%, which results in only a reflectance of approximately 2% in total. Thus, less brighter view can be obtained.

In contrast, in the head-up display optical film illustrated in FIG. 1, the first optical layer 210 is made of a half-wave plate that converts the polarization plane of incident light by 90 degrees. Hence, P-polarized incident light can be converted to S-polarized light, and a high reflectance of S-polarized light is obtained at the interface between the first optical layer 210 and the intermediate optical layer 220 and the interface between the intermediate optical layer 220 and the second optical layer 230.

Furthermore, in the head-up display optical film illustrated in FIG. 1, the second optical layer 230 is made of a half-wave plate that converts the polarization plane of incident light by 90 degrees. Hence, the light incident as S-polarized light on the second optical layer 230 has been converted to P-polarized light at the second major surface 232 of the second optical layer 230. Because the incident angle is nearly equal to Brewster's angle $\theta_B$, the reflectance of the fourth reflected light 132 at the second major surface 232 of the second optical layer 230 can be reduced to substantially zero. It is noted that the reflectance of the third reflected light 131 at the first major surface 211 of the first optical layer can be neglected, because the incident angle is nearly equal to Brewster's angle $\theta_B$.

Thus, in the head-up display optical film 10 illustrated in FIG. 1, the reflectance of the reflected light (fourth reflected light 132) at the outside of the optical film can be reduced to substantially zero, achieving a high reflectance at the intermediate optical layer 220 inside the head-up display optical film 10. Furthermore, because P-polarized light is used, there is no decrease in brightness of image for a user wearing a polarized sunglass that blocks S-polarized light.

It is noted that the first optical layer 210 and the second optical layer 230 can be a half-wave plate illustratively made of a stretched film of an organic resin. In this case, refractive indices of 1.45 to 1.6 is obtained, depending on the organic resin used.

The above intermediate optical layer 220 can be made of a high refractive index resin, which can be an epoxy resin mixed with fine particles of $TiO_2$ or $ZrO_2$ having a high refractive index and illustratively having a particle diameter of 50 nm or less. In this case, refractive indices of 1.8 to 2.2 is obtained depending on content of fine particles. Alternatively, the intermediate optical layer 220 can be a film of a high refractive index material such as $TiO_2$ and $ZrO_2$ formed on the surface of the first optical layer 210 or the second optical layer 230 by sputtering or other method. Furthermore, the intermediate optical layer 220 can be made of a low refractive index material. In this case, the low refractive index material can illustratively be a porous silica material. Then, a refractive index of approximately 1.3 is obtained.

In the foregoing, P-polarized light is caused to be incident on the head-up display optical film. This P-polarized light can be realized illustratively by using a linearly polarized laser, an LED or various lamps linearly polarized by a polarizing filter, various liquid crystal displays provided with a polarizing plate, or a combination of a MEMS (microelectromechanical system) optical switch and a polarizing filter.

In the foregoing, displacement of light beams depending on the thickness of the intermediate optical layer 220 occurs between the first reflected light 121 and the second reflected light 122. However, this displacement causes no practical problem if the thickness of the intermediate optical layer 220 is reduced to e.g. several ten micrometers or less.

Brewster's angle $\theta_B$ is expressed as $\text{Arctan}(n_o/n_i)$, where $n_i$ denotes the refractive index of the incident-side medium and $n_o$ denotes the refractive index of the emission-side medium. In this embodiment, the incident-side medium can be air, where $n_i=1$. Furthermore, in the case where the first optical layer 210 is a half-wave plate made of a stretched film of an organic resin having a refractive index of 1.51, the exact Brewster's angle $\theta_B$ is 56.5 degrees. Here, the reflectance of P-polarized light is zero. However, the reflectance of P-polarized light does not sharply increase with the shift of the incident angle from the exact Brewster's angle $\theta_B$. Hence, in practice, the incident angle may be shifted from the exact Brewster's angle $\theta_B$. It is assumed that the notion of "incidence at Brewster's angle" used herein also encompasses the range of ±5 degrees around the exact Brewster's angle $\theta_B$.

In the foregoing, each refractive index can be the refractive index with respect to visible light, and representatively the refractive index with respect to light at a wavelength of 550 nm. In the above optical design, the characteristics of the first optical layer 210, the intermediate optical layer 220, and the second optical layer 230 can be each suitably configured by taking into consideration the wavelength dispersion of refractive index of the first optical layer 210, the intermediate optical layer 220, and the second optical layer 230 and on the basis of the characteristics with luminous efficiency correction.

The first optical layer 210 and the second optical layer 230 convert the polarization plane of incident light by 90 degrees. However, the term "90 degrees" does not refer to the exact angle, but they only need to have a function of effectively converting the incident light from P-polarization to S-polarization, or effectively converting the incident light from S-polarization to P-polarization. Furthermore, they only need to have a function of mutually converting between P-polarization and S-polarization with respect to the effective wavelength of light used for display.

Second Embodiment

Next, a head-up display according to a second embodiment of the invention is described.

Figure 2:
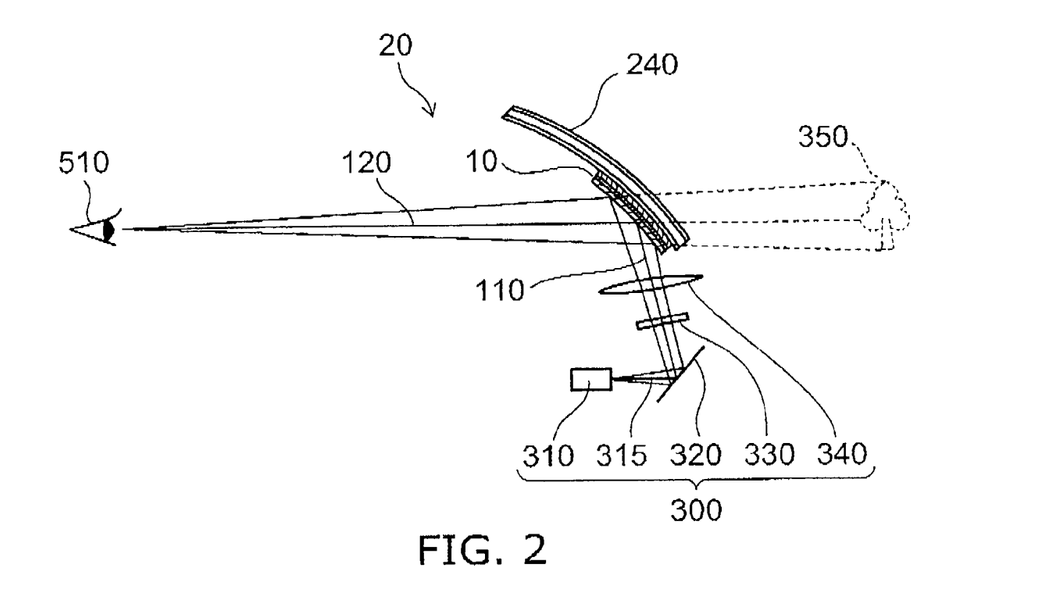
FIG. 2 is a schematic view illustrating the configuration of a head-up display according to a second embodiment of the invention.

FIG. 2 is a schematic view illustrating the configuration of a head-up display according to the second embodiment of the invention.

As shown in FIG. 2, the head-up display 20 of the second embodiment includes the head-up display optical film 10 described above and a projector 300 for causing a P-polarized light beam to be incident on the optical film 10 at Brewster's angle. The light beam 315 emitted from a light source 310 is reflected by a reflector 320, then travels through a screen 330 and a lens 340, and is incident as incident light 110 on the head-up display optical film 10. Then, the incident light 110 produces reflected light 120, which reaches the viewer's eye 510. Thus, the viewer can view a virtual image 350.

In the example of FIG. 2, the distance between the light source 310 and the reflector 320 can be 100 mm, the distance between the reflector 320 and the screen 330 can be 50 mm, the distance between the screen 330 and the head-up display optical film 10 can be 200 mm, and the distance between the head-up display optical film 10 and the viewer's eye 510 can be 1000 mm. However, this setting is illustrative only, and the invention is not limited thereto.

In the head-up display 20 illustrated in FIG. 2, the head-up display optical film 10 is provided on the major surface of a generally plate-like transparent plate 240. The transparent plate 240 can illustratively be a windshield of a car and the like.

In the above head-up display 20, when the light beam 315 is incident on the head-up display optical film 10' the light beam 315 is caused to be P-polarized. This can be realized by using, as the light source 310, a linearly polarized laser, an LED or various lamps linearly polarized by a polarizing filter, various liquid crystal displays provided with a polarizing plate, or a combination of a MEMS (microelectromechanical system) optical switch and a polarizing filter. It can also be realized by providing a polarizing filter (not shown) in the optical path. In the above head-up display 20, the projector 300 illustratively includes a light source 310, a reflector 320, a screen 330, and a lens 340. However, the projector 300 is not limited thereto, but can use various configurations based on the above laser, LED, various lamps, polarizing filter, various liquid crystal displays, and MEMS and other optical switches.

Furthermore, the incident angle is adjusted in the vicinity of Brewster's angle $\theta_B$. The adjustment of the incident angle can be realized by suitably designing the layout of the light source 310, the screen 330, the lens 340, and the transparent plate 240 illustrated in FIG. 2.

As described above, in practice, the incident angle may be shifted from the exact Brewster's angle $\theta_B$. Preferably, the incident angle is controlled within the range of ±5 degrees around Brewster's angle $\theta_B$.

Thus, as described with reference to FIG. 1, the head-up display 20 of this embodiment is visible even through a polarized sunglass that blocks S-polarized light, achieving a display with high reflectance and high visibility.

Next, a description is given of the characteristics of the head-up display of this embodiment in fine weather and rainy weather.

Figure 3A:
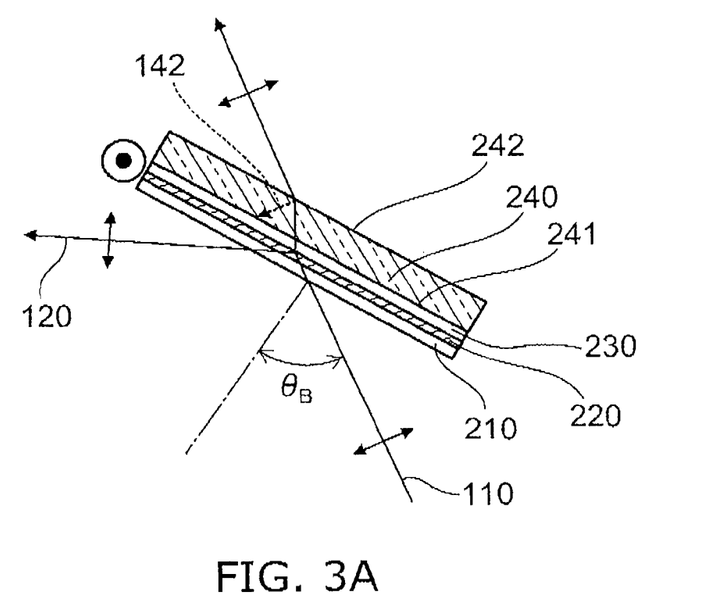
FIGS. 3A and 3B show schematic views illustrating the characteristics of the head-up display according to the second embodiment of the invention.
Figure 3B:
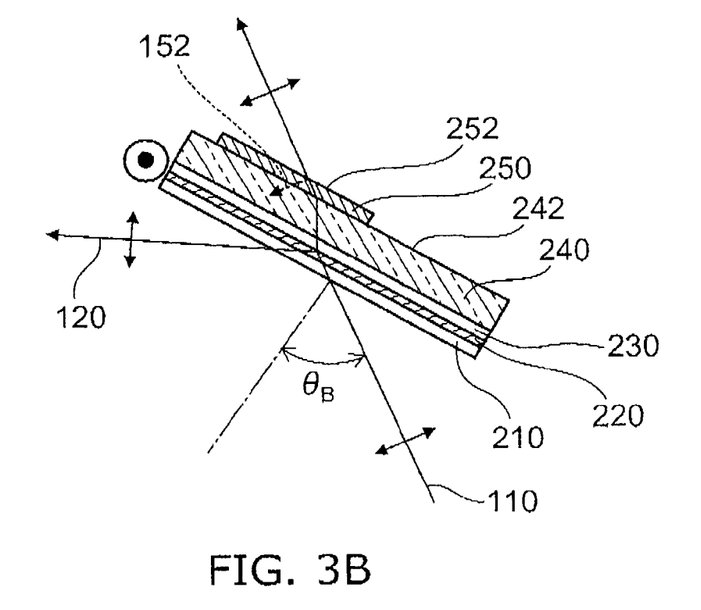

FIG. 3 shows schematic views illustrating the characteristics of the head-up display according to the second embodiment of the invention.

FIGS. 3A and 3B are schematic views illustrating the characteristics on fine weather and rainy weather, respectively. It is noted that the light source 310, the screen 330, and the lens 340 are not shown in FIG. 3.

As shown in FIG. 3A, the head-up display optical film 10 is provided on the first major surface 241 of the transparent plate 240. The transparent plate 240 is illustratively a windshield of a car and the like, and the first major surface 241 of the transparent plate 240 faces inside the car. The second major surface 242 of the transparent plate 240 faces outside the car and is in contact with air in fine weather. P-polarized incident light 110 is caused to be incident on the head-up display optical film 10. The transparent plate 240 is illustratively made of glass, and its refractive index is approximately 1.5. It is also possible to use an organic resin such as acrylic resin and polycarbonate resin, and its refractive index is approximately 1.49 to 1.59.

Here, the reflected light 120 of the head-up display optical film 10 is P-polarized as described with reference to FIG. 1, and its reflectance is approximately 7%, achieving a bright display. If the second optical layer 230 and the transparent plate 240 have comparable refractive indices, no substantial reflection occurs at the interface between the second optical layer 230 and the transparent plate 240.

Furthermore, because the incident light 110 is caused to be incident at Brewster's angle $\theta_B$, the reflectance at the interface between the transparent plate 240 and the outside (the second major surface 242 of the transparent plate 240) can be reduced to substantially zero, effectively avoiding the reflected light 142 at the interface between the transparent plate 240 and the outside. Thus, the head-up display 20 of this embodiment can realize a bright display based on P-polarized light in fine weather, and a favorable display is achieved without reflection at the interface with the outside.

On the other hand, as shown in FIG. 3B, in rainy weather, a water layer 250 is formed on the second major surface 242 of the transparent plate 240. The water layer 250 has a refractive index of 1.33, and the reflectance at the interface between the water layer 250 and the outside (the second major surface 252 of the water layer 250) is 0.1% or less. Hence, the reflected light 152 at the interface between the water layer 250 and the outside has low brightness, and practically negligible.

Thus, the head-up display 20 illustrated in FIGS. 2 and 3 can substantially eliminate reflection at the interface with the outside in both fine weather and rainy weather.

As illustrated above, the refractive index of the transparent plate 240 can be set nearly equal to the refractive index of water. Hence, reflection at the interface between the transparent plate 240 and the water layer 250 is small and also practically negligible.

Thus, the head-up display 20 illustrated in FIGS. 2 and 3 is visible even using a polarized sunglass that blocks S-polarized light, and reduces reflectance at the glass outside surface also in rainy weather, achieving a display with high reflectance at the display surface and good visibility.

First Comparative Example

Figure 4:
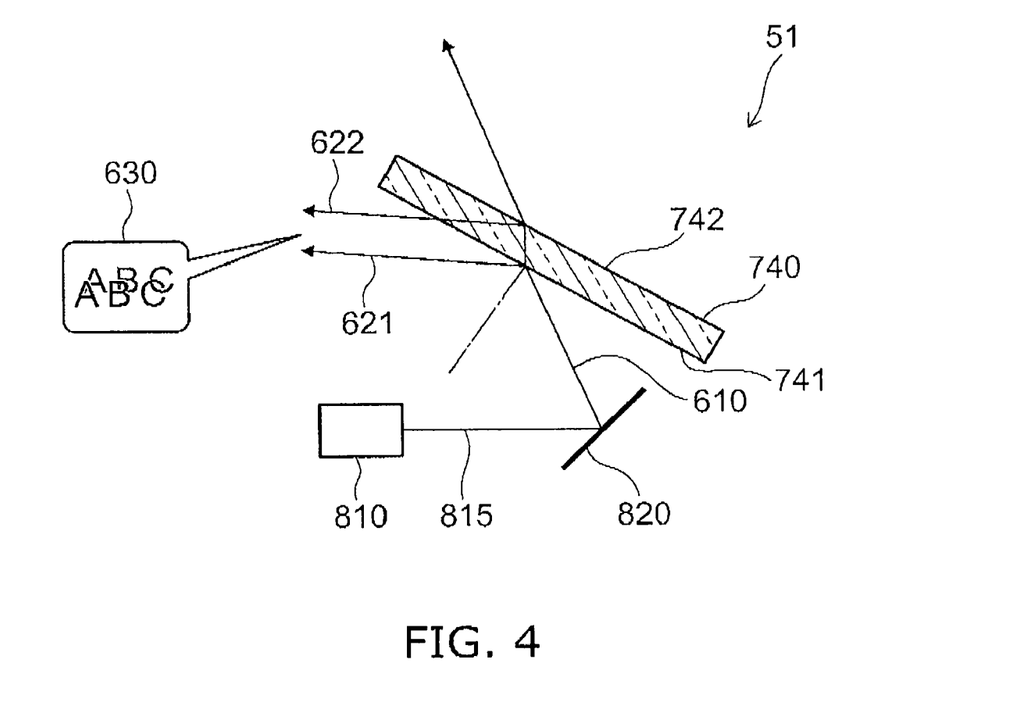
FIG. 4 is a schematic view illustrating the configuration of a head-up display of a first comparative example.

FIG. 4 is a schematic view illustrating the configuration of a head-up display of a first comparative example.

As shown in FIG. 4, the head-up display 51 of the first comparative example includes a transparent plate 740. A light beam 815 generated in a light source 810 reaches a reflector 820 to produces incident light 610, which is projected on the transparent plate 740 for display. It is noted that the screen and the lens are not shown in this figure. In the case where the transparent plate 740 is illustratively made of glass, the reflected light 621 at the first major surface 741 of the transparent plate 740 and the second reflected light 622 at the second major surface 742 of the transparent plate 740 both have a reflectance of approximately 30.5%. Hence, the first reflected light 621 and the second reflected light 622 are viewed at nearly the same brightness. Here, the typical thickness of the transparent plate 740 is approximately several millimeters, producing a large displacement between the optical paths of the first reflected light 621 and the second reflected light 622. Hence, parallax (phenomenon of image doubling) occurs, and a double image 630 is viewed, resulting in very poor visibility.

Second Comparative Example

Figure 5A:
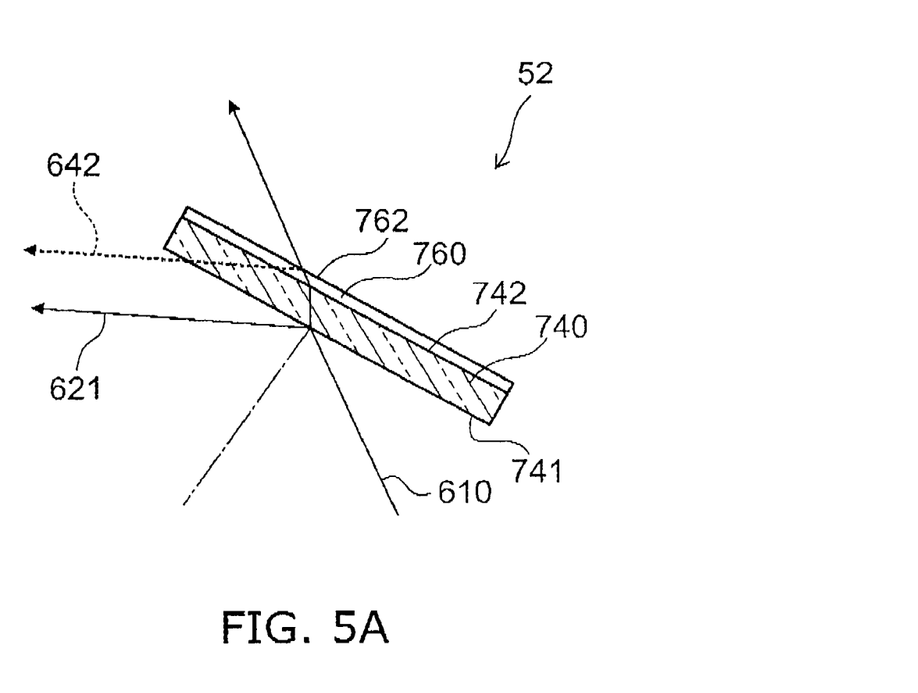
FIGS. 5A and 5B are schematic views illustrating the configuration of a head-up display of a second comparative example.

To reduce this parallax (phenomenon of image doubling), the second comparative example provides a low-reflection layer outside the transparent plate 740.

Figure 5B:
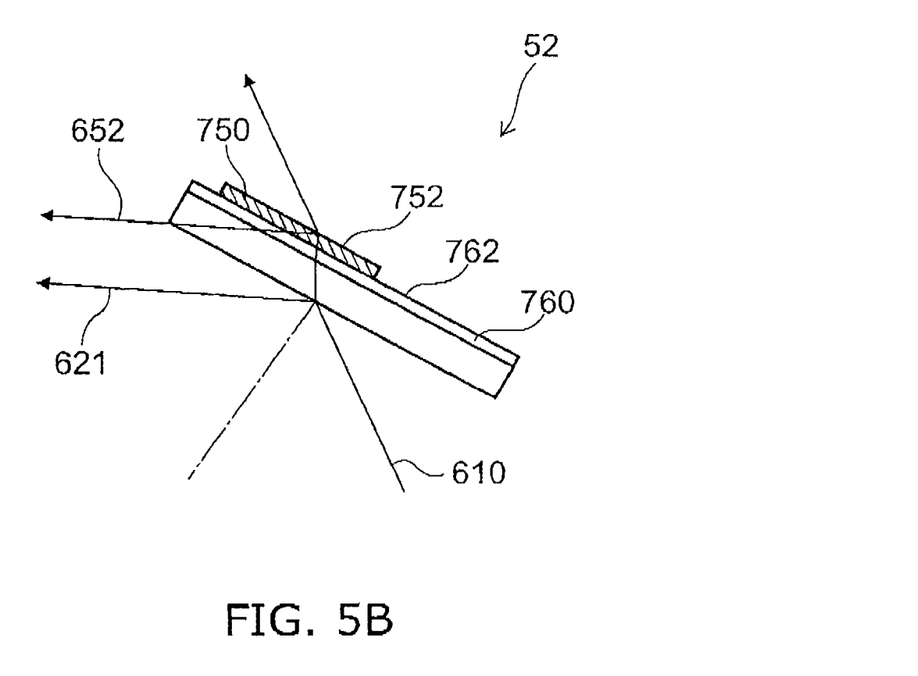

FIG. 5 is a schematic view illustrating the configuration of a head-up display of the second comparative example.

FIGS. 5A and 5B illustrate the characteristics of the head-up display of the second comparative example in fine weather and rainy weather, respectively.

As shown in FIG. 5A, in the head-up display 52 of the second comparative example, a low-reflection layer 760 is provided on the second major surface 742 of the transparent plate 740. The low-reflection layer 760 has a refractive index such as to adjust the refractive index of the transparent plate 740 and the refractive index of the outside air, and can illustratively be formed by sputtering or evaporation on the second major surface 742 of the transparent plate 740. Alternatively, it can also be formed by coating the transparent plate 740 with a resin containing fine particles for refractive index adjustment. By this low-reflection layer 760, the reflectance at the interface between the low-reflection layer 760 and the outside (the second major surface 762 of the low-reflection layer 760) can be reduced to approximately 0.3 to 0.5%. Thus, the reflected light 642 at the interface between the low-reflection layer 760 and the outside has low brightness, and the image doubling can be avoided to some extent.

However, as shown in FIG. 5B, in rainy weather, a water layer 750 is formed on the second major surface 742 of the transparent plate 740. Hence, reflected light 652 is produced at the interface between this water layer 750 and the outside air (the second major surface 752 of the water layer 750), and its reflectance is approximately 3.5%. Thus, the reflected light 621 and the reflected light 652 are viewed, resulting in parallax (phenomenon of image doubling).

As described above, the method of providing a low-reflection layer 760 outside the transparent plate 740 cannot reduce parallax (phenomenon of image doubling) in rainy weather.

Third Comparative Example

Figure 6:
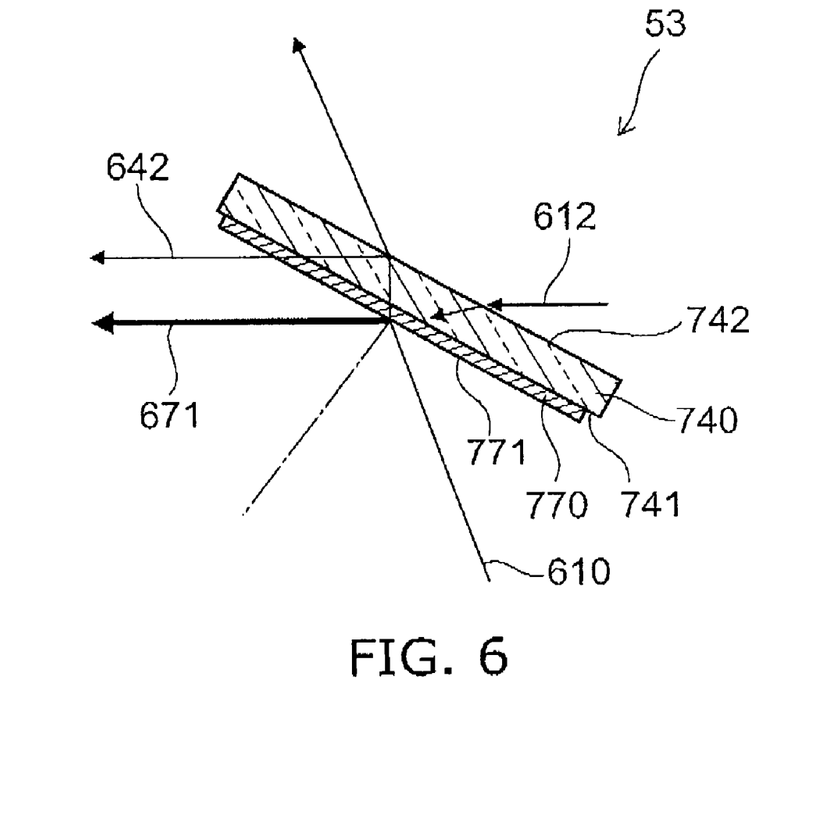
FIG. 6 is a schematic view illustrating the configuration of a head-up display of a third comparative example.

In the third comparative example, a high-reflection layer is provided inside the transparent plate 740.

FIG. 6 is a schematic view illustrating the configuration of a head-up display of the third comparative example.

As shown in FIG. 6, in the head-up display 53 of the third comparative example, a high-reflection layer 770 is provided inside the transparent plate 740, that is, on the first major surface 741 thereof. The high-reflection layer 770 is illustratively a high-reflection sheet of a dielectric multilayer film. In this case, use of the high-reflection layer 770 improves reflectance at the first major surface 771 of the high-reflection layer 770, illustratively resulting in a reflectance of 35%. Hence, the reflected light 671 at the first major surface 771 of the high-reflection layer 770 has high brightness. Here, the reflected light 642 at the second major surface 742 of the transparent plate 740 has a reflectance of approximately 3.5%, and the ratio of brightness between the reflected light 671 and the reflected light 642 is 10:1. Thus, parallax (double image) can be substantially eliminated. Furthermore, the reflected light 671 with high brightness can be viewed, and the view of the head-up display 53 is improved in visibility.

However, the high-reflection layer 770 decreases the transmittance of light 612 incident from outside through the transparent plate 740 on the high-reflection layer 770. Hence, impractically, the visibility of the outside background is deteriorated.

Alternatively, the high-reflection layer 770 can be made of a hologram device. However, this can only reduce the reflectance of a single wavelength, and hence is not applicable to color display.

Fourth Comparative Example

The fourth comparative example is based on a half-wave plate.

Figure 7A:
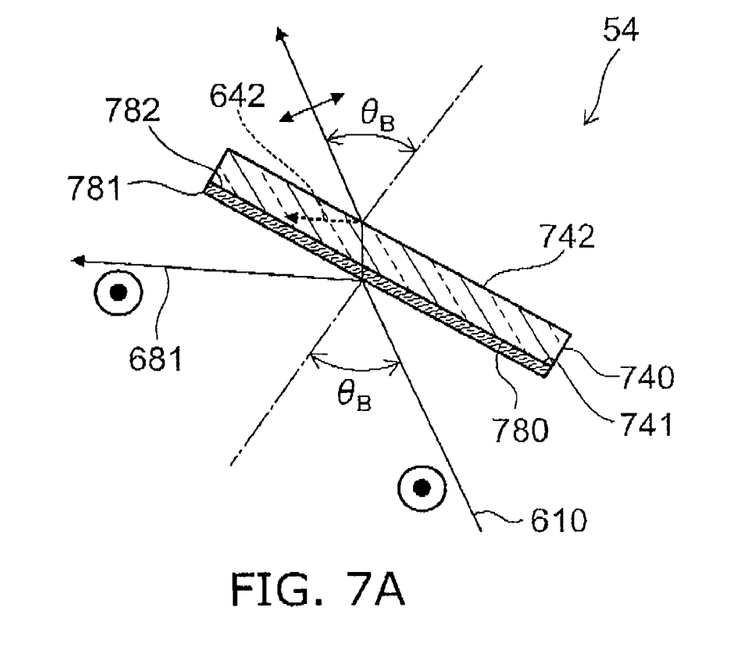
FIGS. 7A and 7B are schematic views illustrating the configuration of a head-up display of a fourth comparative example.
Figure 7B:
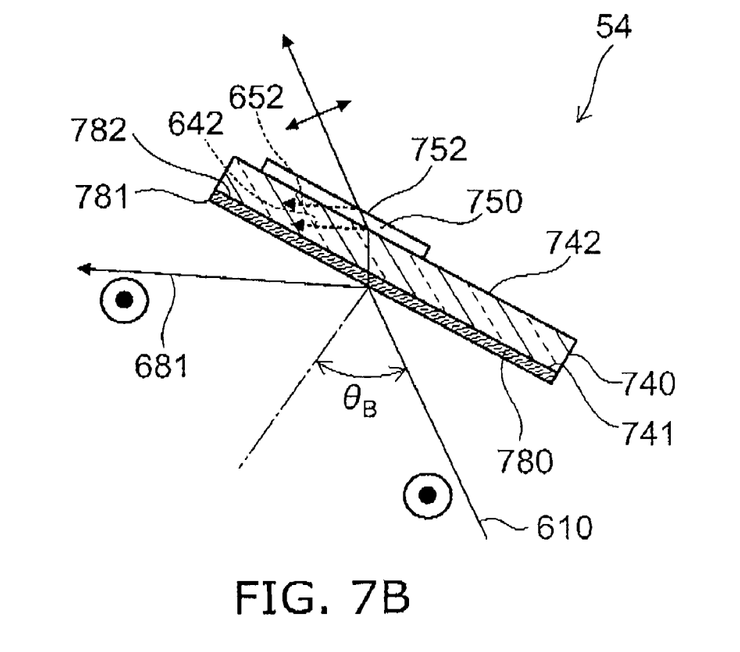

FIG. 7 is a schematic view illustrating the configuration of a head-up display of the fourth comparative example.

FIGS. 7A and 7B illustrate the characteristics of the head-up display of the fourth comparative example in fine weather and rainy weather, respectively, where the light source, reflector, screen, and lens are not shown.

As shown in FIG. 7A, the head-up display 54 of the fourth comparative example has a half-wave plate 780 inside the transparent plate 740 made of glass, that is, on the first major surface 741 thereof. If S-polarized incident light 610 is incident on the half-wave plate 780 at Brewster's angle $\theta_B$, S-polarized reflected light 681 with high reflectance is produced at the first major surface 781 of the half-wave plate 780. On the other hand, in the incident light 610, the light that has entered the half-wave plate 780 propagates in the half-wave plate 780 and has been P-polarized at the second major surface 782 of the half-wave plate. If the half-wave plate 780 and the transparent plate 740 have comparable refractive indices, no substantial reflection occurs at the interface therebetween, and the light reaches the second major surface 742 of the transparent plate 740 with its P-polarization left unchanged. Here, the light is incident at nearly Brewster's angle $\theta_B$ and P-polarized at the second major surface 742 of the transparent plate 740. Hence, reflection at this interface is substantially zero.

Figure 8A:
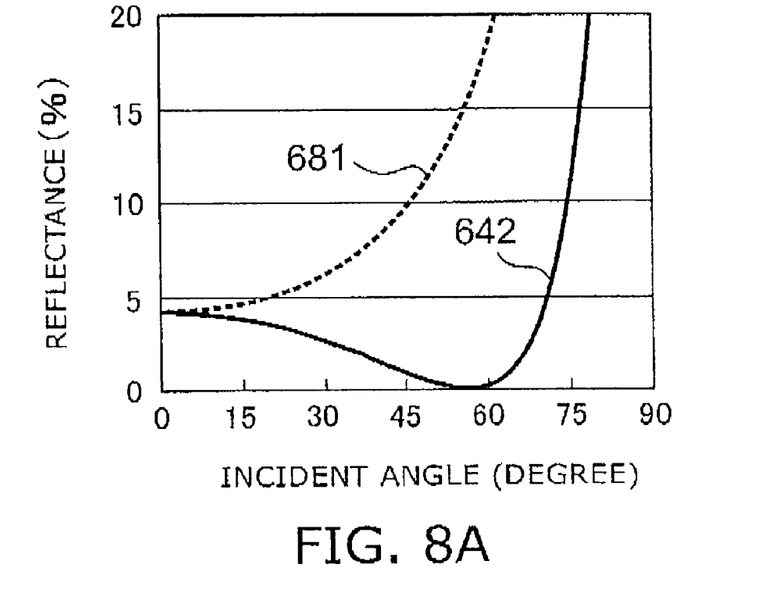
FIGS. 8A and 8B are graphs illustrating simulation results for the relationship between incident angle and reflectance in the head-up display of the fourth comparative example.
Figure 8B:
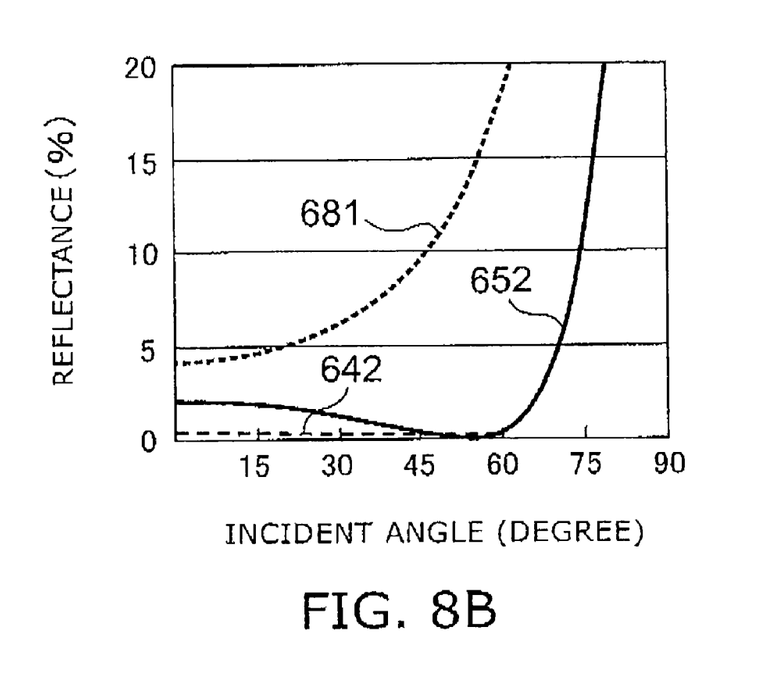

FIG. 8 is a graph illustrating simulation results for the relationship between incident angle and reflectance in the head-up display of the fourth comparative example.

FIGS. 8A and 8B illustrate the characteristics of the head-up display of the fourth comparative example in fine weather and rainy weather, respectively, where the horizontal axis represents incident angle, and the vertical axis represents reflectance.

As shown in FIG. 8A, when the incident angle is equal to Brewster's angle $\theta_B$ (56.5 degrees), the reflected light 681 at the first major surface 781 of the half-wave plate 780 has a reflectance of approximately 16%, and thus has high intensity. On the other hand, the reflected light 642 at the second major surface 742 of the transparent plate 740 is substantially zero when the incident angle is equal to Brewster's angle $\theta_B$.

Thus, the head-up display 54 of the fourth comparative example has high reflectance in fine weather, and a display avoiding reflection at the outside surface can be achieved.

On the other hand, in rainy weather, as shown in FIG. 7B, a water layer 750 is formed on the second major surface 742 of the transparent plate 740. Here, as shown in FIG. 8B, when the incident angle is equal to Brewster's angle $\theta_B$ (56.5 degrees), the reflected light 642 at the interface between the transparent plate 740 and the water layer 750 (the second major surface 742 of the transparent plate 740) has a reflectance of as low as 0.1% or less, which is effectively negligible. Furthermore, as shown in FIG. 8B, the light is P-polarized at the interface between the water layer 750 and the outside (the second major surface 752 of the water layer 750). When the incident angle is equal to Brewster's angle $\theta_B$ (56.5 degrees), the reflected light 652 at that interface has a reflectance of as low as 0.17%, which is effectively negligible. The reflected light 681 at the first major surface 781 of the half-wave plate 780 has a reflectance of approximately 16% like in fine weather.

Thus, the head-up display 54 of the fourth comparative example can effectively avoid reflection at the interface with the outside of the windshield in both fine weather and rainy weather and resolve parallax (phenomenon of image doubling). However, the reflected light 681 is S-polarized, and the image is invisible for a user wearing a polarized sunglass that blocks S-polarized light.

In contrast, as described above, the head-up display 20 of the embodiment of the invention provides a viewer with P-polarized light. Hence, the image is visible even using a polarized sunglass that blocks S-polarized light. Furthermore, in both fine weather and rainy weather, reflection at the interface with the outside can be effectively eliminated, and a display with good visibility free from parallax (phenomenon of image doubling) can be realized.

Third Embodiment

In FIG. 2, the transparent plate 240 can illustratively be a car windshield. Thus, simultaneously with the background field outside the car windshield, various traffic information can be displayed and viewed through the windshield.

Figure 9:
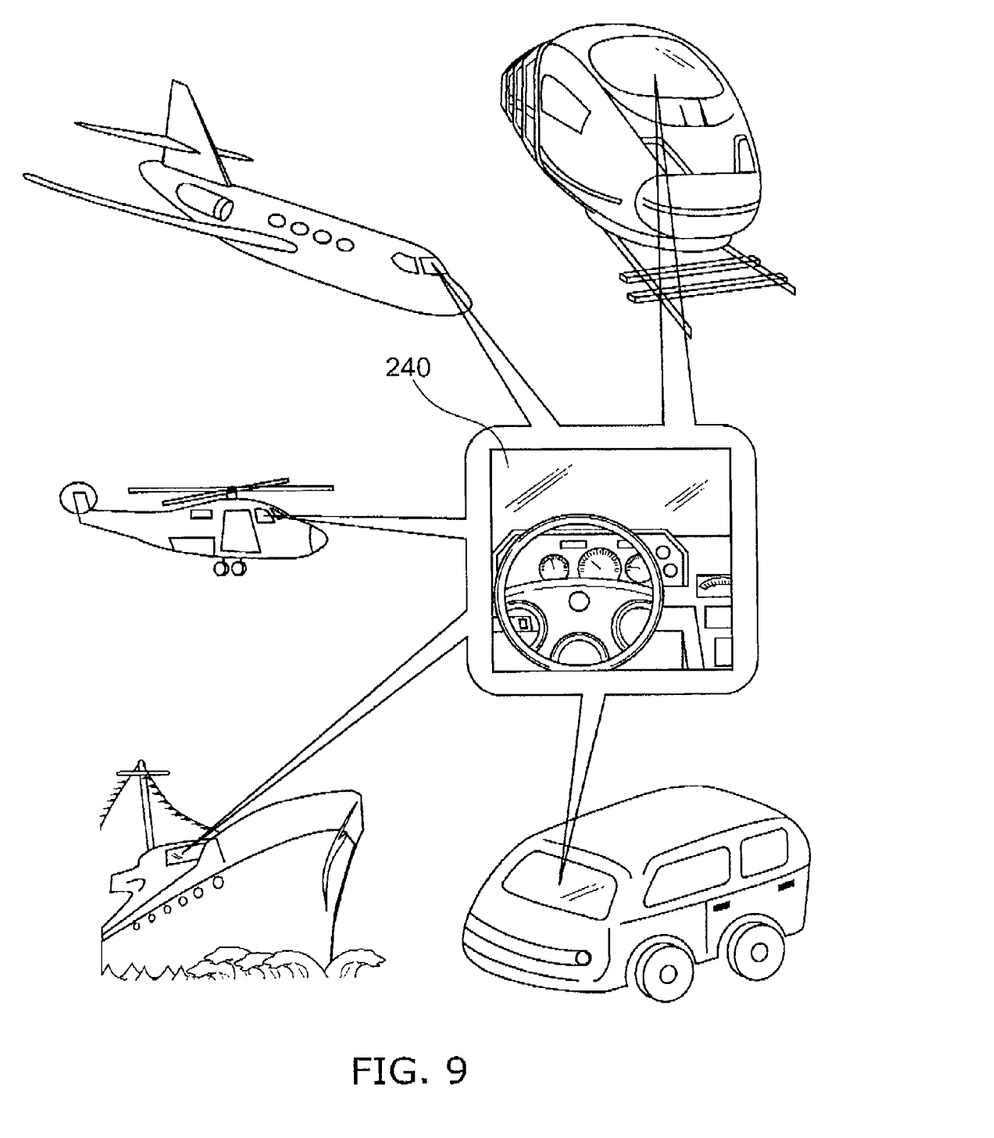
FIG. 9 is a schematic view illustrating a vehicle according to a third embodiment of the invention.

FIG. 9 is a schematic view illustrating a vehicle according to a third embodiment of the invention.

As shown in FIG. 9, the window, for example, in various vehicles of the third embodiment of the invention, such as a car, train, ship, helicopter, and aircraft, can be based on the transparent plate 240 to realize the head-up display of the above embodiment.

Hence, the image is visible even using a polarized sunglass that blocks S-polarized light. Reflectance at the glass outside surface can be reduced also in rainy weather, achieving good visibility with high reflectance at the windshield surface. Thus, a safe vehicle capable of efficient travel can be provided.

In the foregoing, the intermediate optical layer 220 illustratively uses particles having a high refractive index, such as particles of $TiO_2$ (refractive index 2.3) or $ZrO_2$ (refractive index 2.0). However, the intermediate optical layer 220 is not limited thereto, but can be made of various materials such as ITO (refractive index 1.85), $HfO_2$ (refractive index 1.95), and $Ta_2O_5$ (refractive index 2.1). Organotitanium materials can also be used.

The first optical layer 210 and the second optical layer 230 can be a stretched film made of various materials, such as polycarbonate (PC), polyvinyl alcohol (PVA), polyallylate (PA), polysulfone (PSU), and polyolefin (PO). Furthermore, a polymer liquid crystal can be used. These materials are different in the value of refractive index and the wavelength dispersion of refractive index. By taking these into consideration, the head-up display optical film and the head-up display of the present embodiments can be appropriately designed.

The embodiments of the invention have been described with reference to examples. However, the invention is not limited to these examples. For instance, specific configurations of the components constituting the head-up display optical film, the head-up display, and the vehicle are encompassed within the scope of the invention as long as those skilled in the art can similarly practice the invention and achieve similar effects by suitably selecting such configurations from conventionally known ones.

Furthermore, any two or more components of the examples can be combined with each other as long as technically feasible, and such combinations are also encompassed within the scope of the invention as long as they fall within the spirit of the invention.

Furthermore, those skilled in the art can suitably modify and implement the head-up display optical film, the head-up display, and the vehicle described above in the embodiments of the invention, and any head-up display optical films, head-up displays, and vehicles thus modified are also encompassed within the scope of the invention as long as they fall within the spirit of the invention.

Furthermore, those skilled in the art can conceive various modifications and variations within the spirit of the invention, and it is understood that such modifications and variations are also encompassed within the scope of the invention.

The invention claimed is:

1. A head-up display optical film comprising:
   a first optical layer configured to convert the polarization plane of incident light by 90 degrees;

a second optical layer configured to convert the polarization plane of incident light by 90 degrees; and
an intermediate optical layer sandwiched between the first optical layer and the second optical layer and having a refractive index that is different from the refractive index of the first optical layer and from the refractive index of the second optical layer,
wherein at least one of the first optical layer and the second optical layer is a half-wave plate made of a stretched film of an organic resin.

2. A head-up display optical film comprising:
a first optical layer configured to convert the polarization plane of incident light by 90 degrees;
a second optical layer configured to convert the polarization plane of incident light by 90 degrees; and
an intermediate optical layer sandwiched between the first optical layer and the second optical layer and having a refractive index that is different from the refractive index of the first optical layer and from the refractive index of the second optical layer,
wherein at least one of the first optical layer and the second optical layer is a stretched film made of at least one selected from the group consisting of polycarbonate, polyvinyl alcohol, polyallylate, polysulfone, and polyolefin and the intermediate optical layer includes porous silica.

3. A head-up display optical film comprising:
a first optical layer configured to convert the polarization plane of incident light by 90 degrees;
a second optical layer configured to convert the polarization plane of incident light by 90 degrees; and
an intermediate optical layer sandwiched between the first optical layer and the second optical layer and having a refractive index that is different from the refractive index of the first optical layer and from the refractive index of the second optical layer,
wherein at least one of the first optical layer and the second optical layer includes a polymer liquid crystal and the intermediate optical layer includes porous silica.

4. A head-up display optical film comprising:
a first optical layer configured to convert the polarization plane of incident light by 90 degrees;
a second optical layer configured to convert the polarization plane of incident light by 90 degrees; and
an intermediate optical layer sandwiched between the first optical layer and the second optical layer and having a refractive index that is different from the refractive index of the first optical layer and from the refractive index of the second optical layer,
wherein the refractive index of the intermediate optical layer is higher than the refractive index of the first optical layer and higher than the refractive index of the second optical layer and at least one of the first optical layer and the second optical layer is a half-wave plate made of a stretched film of an organic resin.

5. A head-up display optical film comprising:
a first optical layer configured to convert the polarization plane of incident light by 90 degrees;
a second optical layer configured to convert the polarization plane of incident light by 90 degrees; and
an intermediate optical layer sandwiched between the first optical layer and the second optical layer and having a refractive index that is different from the refractive index of the first optical layer and from the refractive index of the second optical layer,
wherein the intermediate optical layer includes at least one selected from the group consisting of $TiO_2$, $ZrO_2$, $HfO_2$, $Ta_2O_5$, indium tin oxide, and organotitanium and at least one of the first optical layer and the second optical layer is a half-wave plate made of a stretched film of an organic resin.

6. A head-up display optical film comprising:
a first optical layer configured to convert the polarization plane of incident light by 90 degrees;
a second optical layer configured to convert the polarization plane of incident light by 90 degrees; and
an intermediate optical layer sandwiched between the first optical layer and the second optical layer and having a refractive index that is different from the refractive index of the first optical layer and from the refractive index of the second optical layer,
wherein the intermediate optical layer includes a particle made of at least one selected from the group consisting of $TiO_2$, $ZrO_2$, $HfO_2$, $Ta_2O_5$, indium tin oxide, and organotitanium and at least one of the first optical layer and the second optical layer is a half-wave plate made of a stretched film of an organic resin.

7. A head-up display optical film comprising:
a first optical layer configured to convert the polarization plane of incident light by 90 degrees;
a second optical layer configured to convert the polarization plane of incident light by 90 degrees; and
an intermediate optical layer sandwiched between the first optical layer and the second optical layer and having a refractive index that is different from the refractive index of the first optical layer and from the refractive index of the second optical layer,
wherein the intermediate optical layer is made of an epoxy resin including a particle made of at least one of $TiO_2$ and $ZrO_2$.

8. A head-up display optical film comprising:
a first optical layer configured to convert the polarization plane of incident light by 90 degrees;
a second optical layer configured to convert the polarization plane of incident light by 90 degrees; and
an intermediate optical layer sandwiched between the first optical layer and the second optical layer and having a refractive index that is different from the refractive index of the first optical layer and from the refractive index of the second optical layer,
wherein the intermediate optical layer is a film made of at least one selected from the group consisting of $TiO_2$, $ZrO_2$, $HfO_2$, $Ta_2O_5$, indium tin oxide, and organotitanium, the film being formed on a surface of at least one of the first optical layer and the second optical layer, and at least one of the first optical layer and the second optical layer is a half-wave plate made of a stretched film of an organic resin.

9. The film according to claim 8, wherein the film of the intermediate optical layer is formed by sputtering.

10. A head-up display optical film comprising:
a first optical layer configured to convert the polarization plane of incident light by 90 degrees;
a second optical layer configured to convert the polarization plane of incident light by 90 degrees; and
an intermediate optical layer sandwiched between the first optical layer and the second optical layer and having a refractive index that is different from the refractive index of the first optical layer and from the refractive index of the second optical layer,
wherein the refractive index of the intermediate optical layer is lower than the refractive index of the first optical layer and lower than the refractive index of the second optical layer and at least one of the first optical layer and the second optical layer is a half-wave plate made of a stretched film of an organic resin.

11. A head-up display optical film comprising:
a first optical layer configured to convert the polarization plane of incident light by 90 degrees;
a second optical layer configured to convert the polarization plane of incident light by 90 degrees; and
an intermediate optical layer sandwiched between the first optical layer and the second optical layer and having a refractive index that is different from the refractive index of the first optical layer and from the refractive index of the second optical layer,
wherein the intermediate optical layer includes a porous silica.

12. A head-up display comprising:
a head-up display optical film including:
a first optical layer configured to convert the polarization plane of incident light by 90 degrees;
a second optical layer configured to convert the polarization plane of incident light by 90 degrees, wherein at least one of the first optical layer and the second optical layer is a half-wave plate made of a stretched film of an organic resin; and
an intermediate optical layer sandwiched between the first optical layer and the second optical layer and having a refractive index that is different from the refractive index of the first optical layer and from the refractive index of the second optical layer; and
a projector configured to cause a P-polarized light beam to be incident on the optical film at Brewster's angle.

13. The display according to claim 12, wherein the projector causes the P-polarized light beam to be incident on the optical film at an angle within a range of ±5 degrees around Brewster's angle.

14. The display according to claim 12, wherein the projector includes at least one of a linearly polarized laser, an LED and a lamp linearly polarized by a polarizing filter, and a liquid crystal display and a MEMS (microelectromechanical system) provided with a polarizing plate.

15. The display according to claim 12, wherein the projector includes a linear filter provided in an optical path of the light beam.

16. A vehicle comprising:
a generally plate-like transparent plate; and
a head-up display including:
a head-up display optical film including:
a first optical layer configured to convert the polarization plane of incident light by 90 degrees;
a second optical layer configured to convert the polarization plane of incident light by 90 degrees, wherein at least one of the first optical layer and the second optical layer is a half-wave plate made of a stretched film of an organic resin; and
an intermediate optical layer sandwiched between the first optical layer and the second optical layer and having a refractive index that is different from the refractive index of the first optical layer and from the refractive index of the second optical layer; and
a projector configured to cause a P-polarized light beam to be incident on the optical film at Brewster's angle;
the head-up display optical film being provided on a major surface of the transparent plate.

17. The vehicle according to claim 16, wherein the transparent plate defines a space that accommodates a rider moving with the vehicle and a space outside the vehicle, and
the optical film is provided inside the space that accommodates the rider.

18. The vehicle according to claim 16, wherein the transparent plate is a windshield of the vehicle.

* * * * *